United States Patent
Campbell et al.

(12)

(10) Patent No.: US 6,518,686 B2
(45) Date of Patent: Feb. 11, 2003

(54) ELECTRIC MOTOR INCLUDING UNITARY BRUSH CARD BUSHING HOLDER

(75) Inventors: Robert Campbell, Techumseh (CA); Steve C. Bailey, London (CA)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/791,349

(22) Filed: Feb. 23, 2001

(65) Prior Publication Data

US 2002/0117931 A1 Aug. 29, 2002

(51) Int. Cl.$^7$ .................. H01R 39/38; H01R 39/40; H02K 13/00
(52) U.S. Cl. .................. 310/239; 310/238; 310/242; 310/245
(58) Field of Search .................. 310/239, 242, 310/248, 251, 238, 89, 90, 91, 42, 43; 384/192, 195, 202, 210

(56) References Cited

U.S. PATENT DOCUMENTS

| | | | | |
|---|---|---|---|---|
| 3,624,434 A | * | 11/1971 | Dafler | 310/90 |
| 4,322,647 A | * | 3/1982 | Neroda et al. | 310/71 |
| 4,782,261 A | * | 11/1988 | Crevling, Jr. et al. | 310/242 |
| 5,055,728 A | * | 10/1991 | Looper et al. | 310/91 |
| 5,237,231 A | * | 8/1993 | Blaettner et al. | 310/239 |
| 5,296,772 A | * | 3/1994 | Bradfield et al. | 310/242 |
| 5,917,258 A | * | 6/1999 | Kershaw et al. | 310/43 |
| 5,945,756 A | * | 8/1999 | Periyathamby et al. | 310/43 |
| 5,969,450 A | * | 10/1999 | Satterfield et al. | 310/90 |
| 5,977,672 A | | 11/1999 | Vacca | 310/90 |
| 6,020,668 A | * | 2/2000 | Rubinchik | 310/239 |
| 6,188,154 B1 | * | 2/2001 | Luedtke et al. | 310/68 C |

\* cited by examiner

*Primary Examiner*—Nestor Ramirez
*Assistant Examiner*—Julio C. Gonzalez
(74) *Attorney, Agent, or Firm*—J. Gordon Lewis

(57) ABSTRACT

A vehicle blower motor includes a housing having a first bushing mounted at a first end about a shaft extending through the housing. A one-piece brush card bushing holder is mounted in the second end of the housing and carries a plurality of brushes engagable with a commutator mounted on the shaft. A second bushing is mounted in the brush card holder and disposed in engagement with the shaft. A portion of the brush card holder is formed as an end plate covering the second end of the housing.

15 Claims, 4 Drawing Sheets

ELECTRIC MOTOR INCLUDING UNITARY BRUSH CARD BUSHING HOLDER

BACKGROUND OF THE INVENTION

Direct current electric motors are commonly used to drive a fan or blower in a vehicle ventilating system. Such motors have a rotating shaft which extends through a motor housing having one end carrying a first bearing or bushing supporting one portion of the shaft and an opposed end carrying an end plate. A second bearing or bushing is typically press fit in the end plate and engages an opposed end portion of the rotating shaft.

As shown in FIG. 1, a prior art electric blower motor for a vehicle ventilating system has a fixed part formed of a generally cylindrical housing or metal body shell having a base wall at one end with an enlarged boss which receives the first bearing or bushing. An end plate is fixedly joined to the other end of the housing. Permanent magnets are mounted on the inner surface of the body shell and surround the shaft. Brushes are mounted in an electrically insulating brush holder or card which is disposed adjacent to the end plate. The brushes make contact with a rotating part or armature of the motor which is mounted on the drive shaft.

The second bearing or bushing is mounted in the end plate by means of a bushing retainer plate and a separate clip which holds the retainer plate in a fixed position within the end plate. An oil throw washer and two separate wear washers are mounted within the housing body between the armature and the second bushing. The oil throw washer is shaped to re-circulate lubricant which has been expelled from the lubricant-impregnated second bushing back toward the second bushing.

In addition to the construction described above and shown in FIG. 1, electric blower motors have also been constructed in which the second bearing is fixedly mounted by means of a press fit into the end cap thereby eliminating the bushing retainer and the separate retainer clip.

However, the number of separate parts typically employed in such blower motors, including the separate end plate, second bearing or bushing, bushing retainer clip, the oil throw washer, and the two separate wear washers can create a manufacturing tolerance dimensional buildup which could result in looseness between the individual parts of the motor. This looseness and/or misalignment can cause objectionable vibration and noise which are readily apparent to the vehicle occupant.

Thus, it would be desirable to provide an electric blower motor in which the individual motor brushes, the rear bearing/bushing, and the motor armature are more accurately aligned to minimize vibration and noise. It would also be desirable to provide an electric blower motor wherein any vibration and noise of the rear bearing/bushing and the motor brushes are isolated from the remainder of the motor components. It would also be desirable to provide an electric blower motor in which the end cap and the brush card are integrated into a one-piece assembly to minimize dimensional tolerance buildup and component misalignment.

SUMMARY

The present invention is a brush card bushing holder for use in an electric motor used in vehicle ventilation systems which minimizes motor component misalignment and dimensional tolerance buildup for more accurate component alignment and less objectionable vibrations and noise.

In one aspect, the present invention is a vehicle blower motor which includes a housing having first and second ends. A first bushing is mounted in the first end of the housing. A rotatable shaft extends through the first end of the housing toward the second end of the housing and forms part of an armature.

A plurality of brushes are engagable with a commutator carried on the shaft. A one-piece, unitary brush card bushing holder is mounted in the second end of the housing and carries the plurality of the brushes. A second bushing is mounted in the brush card bushing holder and disposed in engagement with the shaft. A portion of the brush card bushing holder acts as an end plate covering the second end of the housing.

Preferably, a plurality of resilient grommets are mounted on the brush card bushing holder and are engagable with the housing when the brush card bushing holder is mounted on the housing to vibrationally isolate the holder and, more particularly, the rear bushing from the housing.

In another aspect, mounting means are carried in the brush card bushing holder for securely receiving and mounting the second bushing in the holder.

The brush card bushing holder of the present invention provides numerous advantages when used in a vehicle blower motor. The holder retains the rear bushing and the plurality of brushes in a one-piece body. This enables the bushing to be aligned with the brushes for tighter tolerance control. In addition, the holder also assists in aligning the armature with the rear bushing and the brushes for tighter tolerance control. This tighter tolerance control eliminates multi-part dimensional build up which could cause misalignment, wear, or movement of the individual components resulting in objectionable noise and vibration.

The present holder is also mounted in the motor housing in a manner to vibrationally isolate the rear bushing and the brushes from the rest of the motor to avoid the transmission of noise and vibrations from the rotating portions of the motor to the housing. The holder better aligns the brushes during the assembly process by using the rear bushing to locate the motor shaft before the brushes are released from a retracted position against the biasing force of the brush springs.

The holder also cooperates with an oil slinger or thrower between the commutator and rear or second bushing by creating a pocket which acts as a recirculating oil path. Any oil or lubricant excreted from the rear bushing is returned by the oil slinger through the pocket and back to the outer surface of the bushing where it is reabsorbed. This prevents the oil from leaking to other electrically conductive portions of the motor, interfering with efficient motor operation or causing objectionable noise.

BRIEF DESCRIPTION OF THE DRAWINGS

The various features, advantages, and other uses of the present invention will become more apparent by referring to the following detailed description and drawing in which.

DETAILED DESCRIPTION

Figure 1:
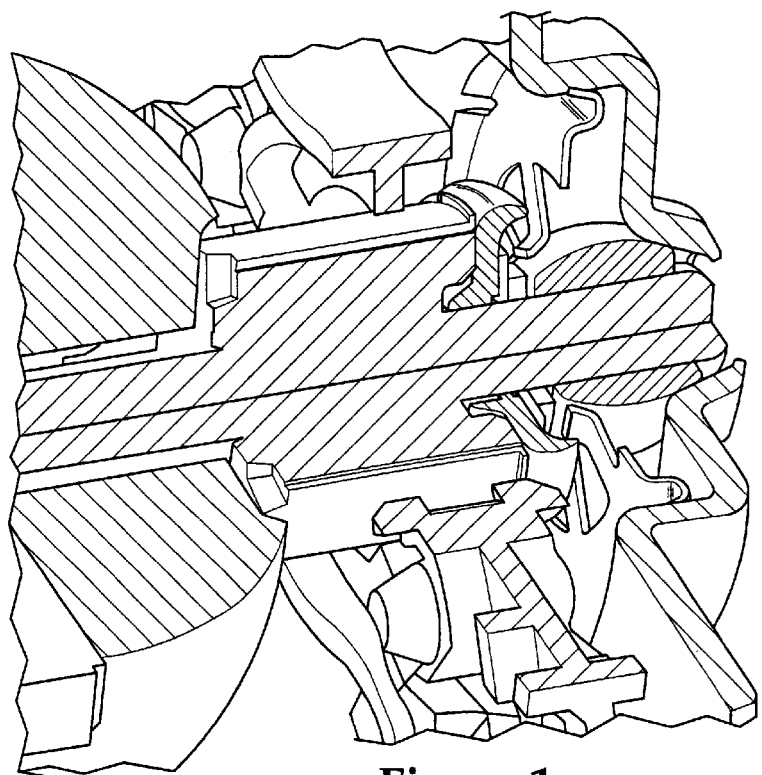
FIG. 1 is an enlarged, partial, perspective view of a prior art blower motor.

Referring now to FIGS. 2–7, there is depicted a motor 10 which is ideally suited for driving a fan or blower in a motor vehicle ventilation system, such as a heating and air-conditioning system, not shown. As shown in detail in FIG. 2, the motor 10 includes a metal body or housing 12 of generally cylindrical form. The housing 12 has a sidewall 14 extending between a first end 16 and an opposed second end 18. The first end 16 has a raised boss or end plate 20. The boss 20 defines an internal cavity within the housing 12 for receiving a first bearing or bushing 22. An aperture is formed in the first end 16 to allow passage of a rotatable shaft 24 therethrough.

The second end 18 of the housing 12 is provided with a plurality of longitudinally inward extending notches or recesses 28. A plurality of bendable tabs 13 project outward from the second end 18.

A pair of semi-circular magnets 32 are fixedly mounted to the inner surface of the sidewall 14 at diametrically opposed positions in the housing 12. An armature 34 is rotatably disposed between the magnets 32.

The second end 18 of the housing 12 would normally be closed by a separate end plate, as in the prior art blower motor shown in FIG. 1. In the present invention, an end plate, a second bushing retainer means and the holders for a plurality of brushes are integrated into a one-piece integral brush card bushing holder 30 which is shown in greater detail in FIGS. 3–7. The integral brush card bushing holder 30, hereafter referred to as the "holder 30", also functions as an end cap in that it is fixedly joined to and spans the second end 18 of the housing 12.

Figure 5:
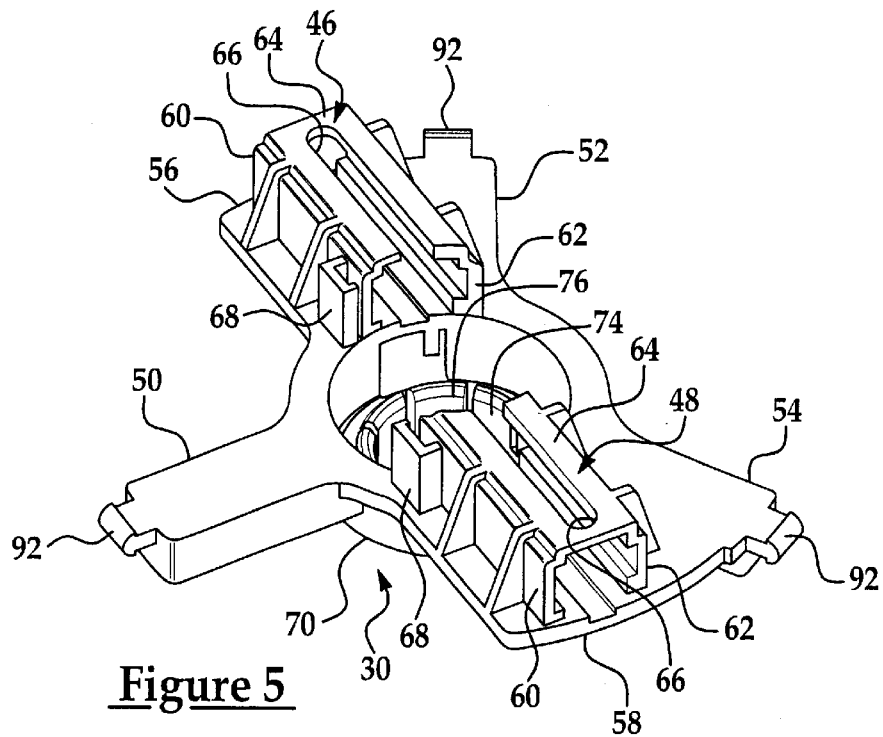
FIGS. 5, 6, and 7 are top, rear and side perspective views of the integral brush card bushing holder shown in FIGS. 3 and 4, with the brushes and brush biasing springs not shown.
Figure 6:
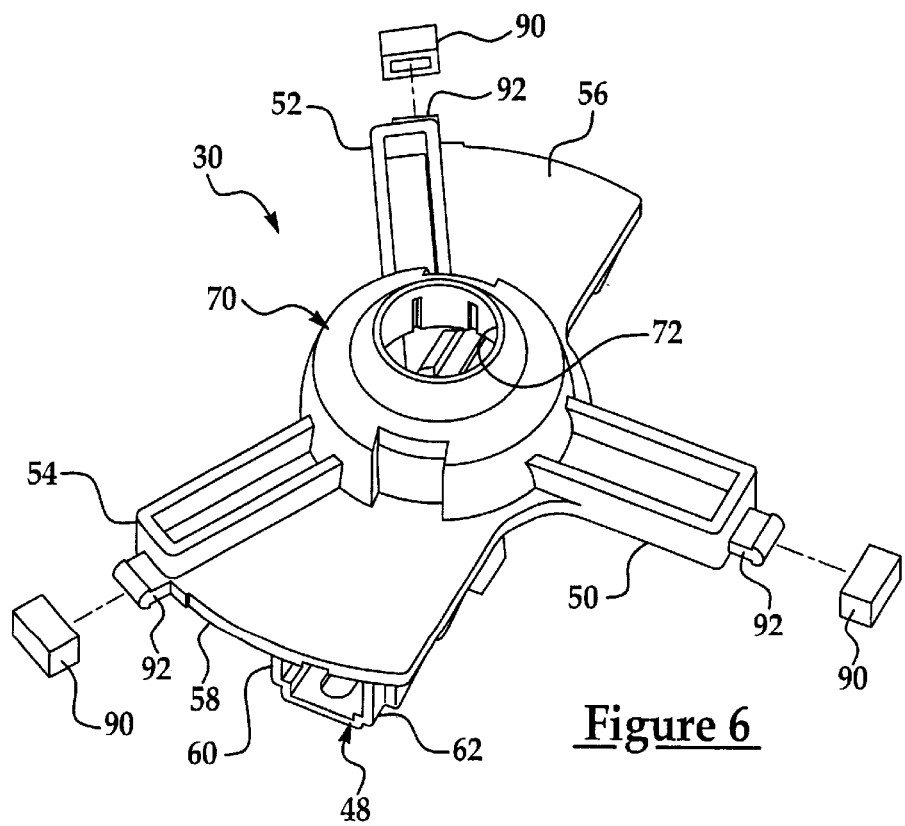
Figure 7:
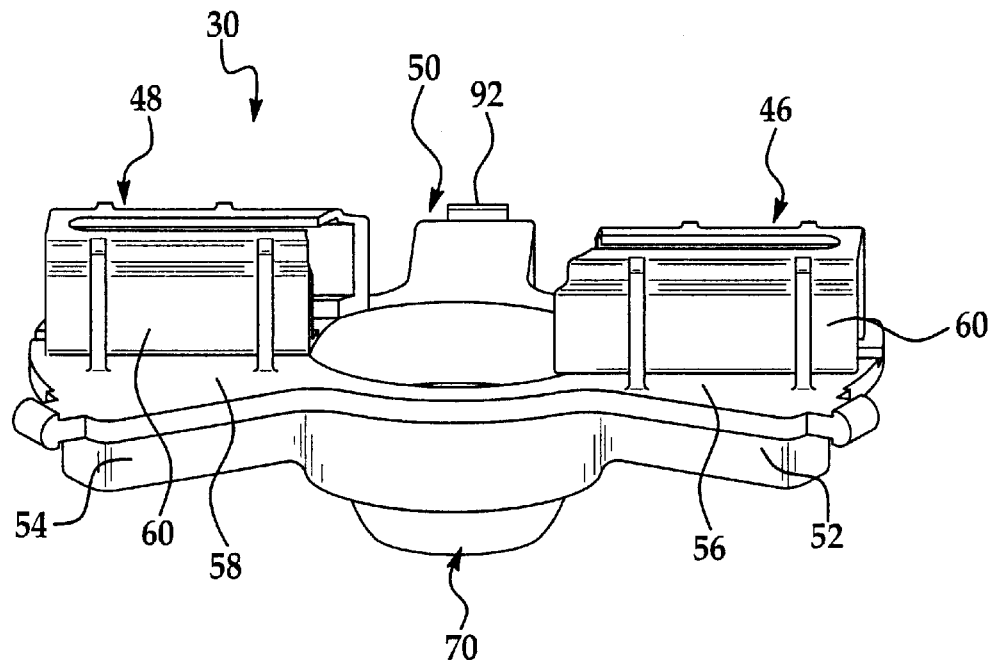

A commutator 40 is fixed to the shaft 24 adjacent to one end of the lamination stack of the armature 34. At least two brushes 42 and 44 are disposed in a position to contact the commutator 40 as the armature 34, including the shaft 24, rotate. The brushes 42 and 44 are mounted in brush boxes 46 and 48, respectively, on the holder 30 as shown in FIGS. 5–7. The holder 30 is formed of an integral, one-piece unitary member of a suitable insulating plastic, such as polybutylene terepthalate (PBT), polypropylene styrene (PPS), or polyphtalarnide (PPA), for example, as well as thermoset plastics.

As shown in FIGS. 5–7, the holder 30 has a generally planar array shape formed of three leg portions 50, 52, and 54 which are circumferentially spaced about a longitudinal axis through the center of the holder 30. Adjoining filler portions between two adjacent legs 50, 52, and 54 are filled in with continuous material in the same plane as the legs 50, 52, and 54. These filler portions 56 and 58 define platforms for the brush box carriers 46 and 48, respectively.

Each brush box 46 and 48 is formed of a pair of sidewalls 60 and 62 which project outwardly from the filler portions 56 and 58. A top wall 64 extends between outer edges of the sidewalls 60 and 62. A slot 66 is formed in each top wall 64 for a brush shunt, not shown, connected to each brush 42 and 44.

The sidewalls 60 and 62 of each brush 46 and 48 slidably receive one of the brushes 42 and 44. A spring, such as a constant force spring 43, is mounted at one end in a spring holder 68 formed on the filler portions 56 and 58 and is extendable into the interior of each brush box 46 and 48 where it wraps around the radially outer end of each brush 42 or 44 to normally bias the brushes 42 and 44 radially inward toward the longitudinal axis extending through the center of the holder 30 where the brushes 42 and 44 electrically engage the rotating commutator 40 on the shaft 24 as shown in FIG. 3.

As shown in FIGS. 5–7, a central portion 70 of the holder 30 projects out of the plane of the legs 50, 52, and 54 and the filler portions 56 and 58 to form a necked down receptacle with a through aperture 72 at one end. As shown in FIG. 5, a plurality of longitudinally extending, circumferentially spaced fingers 74 project longitudinally from an end of the central portion 70, forming a mount for a bushing or bearing 78. Each finger 74 has an inward extending lip 76 at a longitudinal outer end. The lip 76 snaps around the bushing or bearing 78 press fit into the interior of the circumferentially deployed fingers 74.

The second or rear bushing 78 is preferably a sleeve bushing or bearing as compared to a ball bearing used in other motor configurations. The bushing 78, like the first bushing 22, has no moving parts. However, the first and second bushings 22 and 78 are provided with generally spherical peripheral edges for self-alignment within the respective bushing holder structure. It will be understood that the first and second bushings 22 and 78 are also referred to as spherical sleeve bearings.

Figure 3:
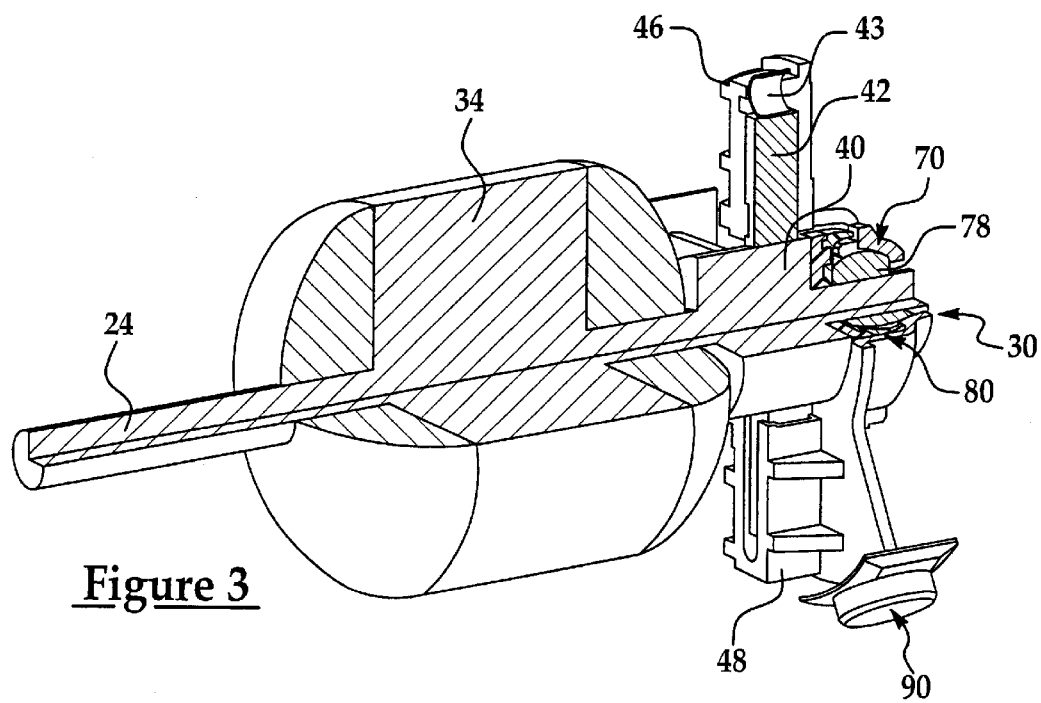
FIG. 3 is a partially cross-sectioned, partial perspective view showing the blower motor of the present invention.
Figure 4:
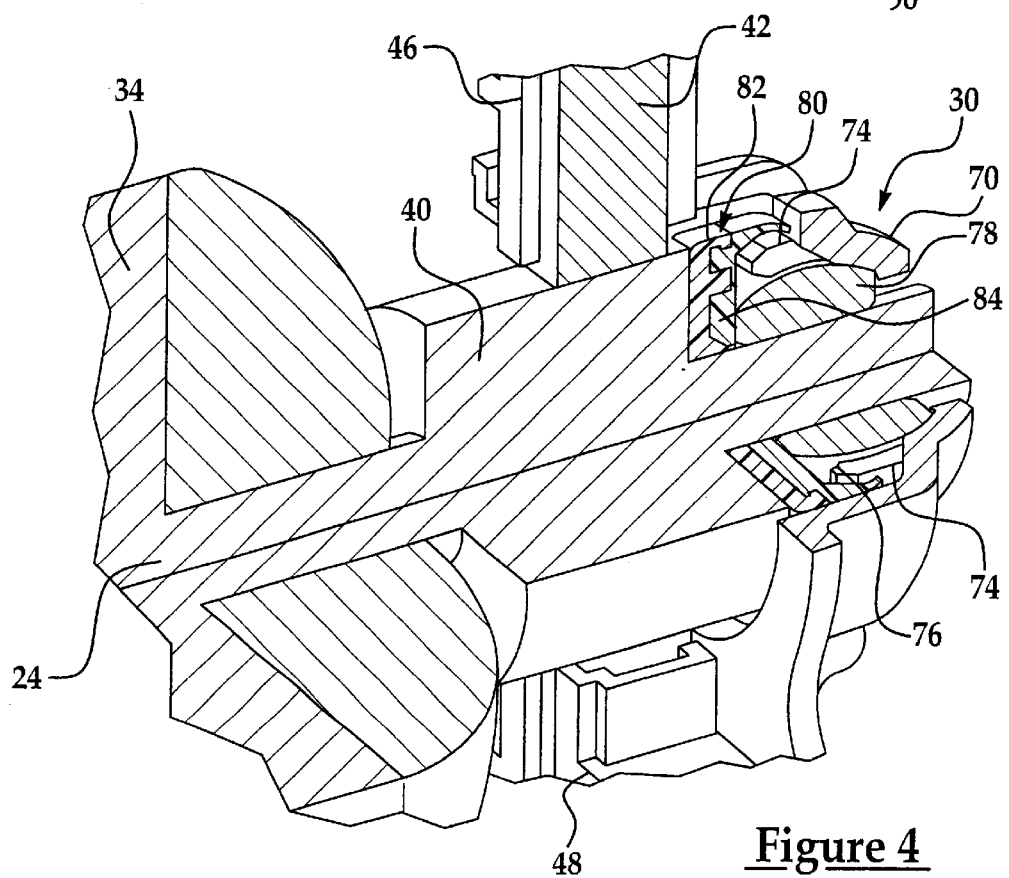
FIG. 4 is an enlarged, partially cross-sectioned, perspective view of the blower motor shown in FIG. 3.
Figure 8:
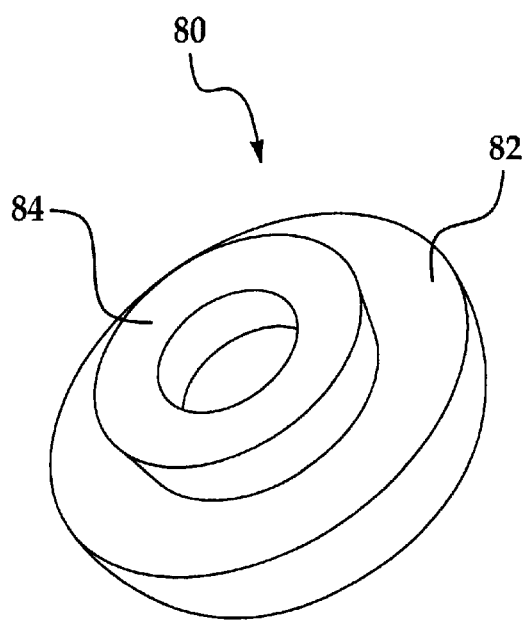
FIG. 8 is a bottom perspective view of the oil slinger shown in FIG. 4.

As shown in FIGS. 3, 4 and 8, an oil slinger or thrower 80 is positioned between the commutator 40 and the second bushing 78. In a preferred embodiment, the oil slinger 80 is preferably formed of an integral body having two distinct, but unitarily joined, first and second portions 82 and 84, each formed of a different material for a different function. The first portion 82 of the oil slinger 80 has a semi-circular, concave shape with outer edges curved toward the second bushing 78. The curved ends of the first portion 82 and the overall position of the oil slinger 80 adjacent to the second bushing 78 enables any oil which is excreted from the oil or lubricant impregnated second bushing 78 to be thrown or re-circulated back toward the second bushing 78 wherein it is reabsorbed by the bushing 78. This therefore keeps the oil from reaching the other electrically conductive portions of the motor 10.

The second portion 84 of the oil slinger 80 is formed of a suitable wear material, such as lubricant filled Nylon 6.6. The first and second portions 82 and 84 are preferably double molded together to form the integrated, one-piece oil slinger 80. The second portion 84 abuts the second bushing 78 to provide a wear surface between the stationary second bushing 78 and the oil slinger 80.

Referring back to FIGS. 5–7, grommets 90, preferably formed of a resilient material, such as rubber or a resilient plastic, are mountable over fingers 92 formed on the ends of each of the legs 50, 52, and 54. Each of the fingers 92 projects radially outward from the end of the corresponding legs 50, 52, and 54 and has a hook-like projection formed at an outer end. The projection engages a lip formed on the inner edge of an internal bore in each grommet 90 to securely hold each grommet 90 on the corresponding finger 92. The grommets 90 can alternately be over molded on the end of the fingers 92.

Figure 2:
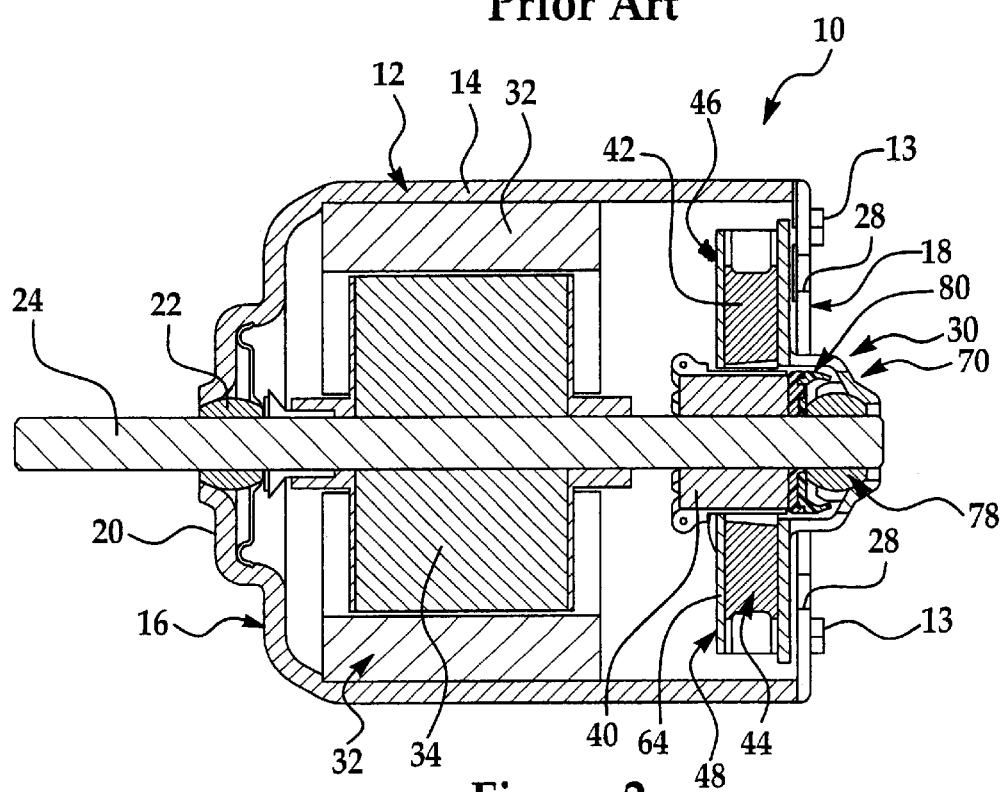
FIG. 2 is a longitudinal cross-sectional view of an electric blower motor having an integral brush card bushing holder according to the present invention mounted therein.

As shown in FIG. 2, the grommets 90 are sized to slide into notches formed in the motor housing 12. The grommets 90 therefore isolate any vibrations of the holder 30 and the bushing 78, shaft 24 and brushes 42 and 44 from the motor housing 12.

In assembling the motor 10, the second bushing 78 is first inserted into central portion 70 of the holder 30 and is fixedly secured within the holder 30 by snap engagement with the lip 76 on the fingers 74. The brushes 42 and 44 are separately inserted into the brush boxes 46 and 48 within the springs and retracted against the springs.

The oil slinger 80 is inserted over the end of the shaft 24 into engagement with the commutator 40. The holder 30 is then mounted over the shaft 24 by locating the shaft 24 with the rear bushing 78.

Next, the grommets 90 are aligned with the notches in the motor housing 12 and slidably inserted into the notches until the grommets 90 bottom out on the inner closed end of the notches.

The brush card bushing holder of the present invention provides several advantages when used in an electric blower motor. The brush card bushing holder 30 retains both the second or rear bushing 78 and the brushes 42 and 44 in position in a single, unitary member without multiple dimensional tolerance build up arising as when such parts are provided as separate members as in prior art motors. The holder 30 also aligns the second bushing 78 with the brushes 42 and 44 for tighter tolerance control. This minimizes the possibility of noise and vibration. The holder 30 also aligns the commutator 40 with the second bushing 78 for tolerance control. The holder 30 also isolates the rear or second bushing 78 and the brushes 42 and 44 from the motor housing 12 to avoid the transmission of noise and vibrations between the rotating armature 34 and the motor housing 12.

The holder 30 also helps in better aligning the brushes 42 and 44 during the assembly process by using the second bushing 78 to locate the shaft 24 before releasing the brushes 42 and 44 from a retracted position against the biasing force generated by the brush springs. Finally, the holder 30 creates a pocket in conjunction with the oil slinger 80 which acts as a recirculation path to bring lubricant excreted from the second bushing 78 back to the second bushing 78.

What is claimed is:

1. A vehicle blower motor, comprising:
   a housing having first and second ends;
   a first bushing mounted in the first end of the housing;
   a rotatable shaft extending through the first end of the housing toward the second end of the housing;
   a commutator disposed in the housing about the shaft;
   at least one brush engagable with the commutator;
   a one-piece, unitary brush card bushing holder mounted in the second end of the housing and carrying the at least one brush, the brush card bushing holder having an integral mount fixedly mounting a second bushing, the second bushing disposed in engagement with the shaft, wherein the mount comprises a plurality of circumferentially spaced, longitudinally extending fingers carried on the brush card bushing holder, the fingers releasably engaging the second bushing to mount the second bushing on the brush card bushing holder; and
   an inward extending lip formed on an end of each finger, the lip engagable with the second bushing to retain the second bushing in engagement with the finger.

2. The motor of claim 1, further comprising:
   a plurality of resilient grommets mounted on the brush card bushing holder.

3. The motor of claim 1, further comprising:
   a plurality of outwardly extending legs formed on the brush card bushing holder; and
   at least one brush box holding a brush, each brush box mounted on a respective one of the plurality of outwardly extending legs.

4. The motor of claim 1, further comprising:
   an oil slinger disposed between the commutator and the second bushing, the oil slinger having a surface shaped to recirculate lubricant from the second bushing back toward the second bushing.

5. The motor of claim 1 wherein the second bushing is a sleeve bushing.

6. A vehicle blower motor, comprising:
   a housing having first and second ends;
   a first bushing mounted in the first end of the housing;
   a rotatable shaft extending through the first end of the housing toward the second end of the housing;
   a commutator disposed in the housing about the shaft;
   at least one brush engagable with the commutator; and
   a one-piece, unitary brush card bushing holder mounted in the second end of the housing and carrying the at least one brush, the brush card bushing holder having an integral mount fixedly mounting a second bushing, the second bushing disposed in engagement with the shaft;
   a plurality of outwardly extending legs formed on the brush card bushing holder;
   at least one brush box holding a brush, each brush box mounted on a respective one of the plurality of outwardly extending legs;
   a plurality of resilient grommets; and
   a lip formed on each of at least two of the plurality of outwardly extending legs, each lip releasably engagable with one of the plurality of grommets to mount the respective grommet on the respective leg.

7. The motor of claim 6 further comprising:
   a receptacle formed on the brush card bushing holder extending from a plane containing the fingers, the mount for the second bushing carried within the receptacle.

8. The motor of claim 6 wherein the at least one brush is a plural of brushes and further comprising:
   a plurality of brush boxes mounted on the brush card bushing holder, each brush box movably receiving one of the plurality of brushes; and
   a spring mounted within each brush box for normally biasing each brush toward the commutator.

9. The motor of claim 6 wherein the mount comprises:
   a plurality of circumferentially spaced, longitudinally extending fingers carried on the brush card bushing holder, the fingers releasably engaging the second bushing to mount the second bushing on the brush card bushing holder.

10. The motor of claim 9 wherein the mount further comprises:
    an inward extending lip formed on an end of each finger, the lip engagable with the second bushing to retain the second bus in engagement with the finger.

11. The motor of claim 6 wherein the second bushing is a sleeve bushing.

12. The motor of claim 6, further comprising:
    an oil slinger disposed between the commutator and the second bushing, the oil slinger having a surface shaped to recirculate lubricant from the second bushing back toward the second bushing.

13. A vehicle blower motor, comprising:
    a housing having first and second ends;
    a first bushing mounted in the first end of the housing;
    a rotatable shaft extending through the first end of the housing toward the second end of the housing;

a commutator disposed in the housing about the shaft;

at least one brush engagable with the commutator;

a one-piece, unitary brush card bushing holder mounted in the second end of the housing and the at least one brush, the brush card bushing holder having an integral mount fixedly mounting a second bushing, the second bushing disposed in engagement with the shaft and wherein the mount includes a plurality of circumferentially spaced, longitudinally extending fingers carried on the brush card bushing holder, the fingers releasably engaging the second bushing to mount the second bushing on the brush card bushing holder and an inward extending lip formed on an end of each finger, the lip engagable with the second bushing to retain the second bushing in engagement with the finger; and an oil slings disposed between the commutator and the second bushing, the oil slinger having a surface shaped to recirculate lubricant from the second bushing back toward the second bushing.

14. The motor of claim 13 wherein the oil slinger abuts the second bushing.

15. The motor of claim 13 wherein the second bushing is a sleeve bushing.

* * * * *